United States Patent [19]

Merritt

[11] Patent Number: 5,702,609

[45] Date of Patent: Dec. 30, 1997

[54] WATER RETRIEVAL FROM AQUEOUS MIXTURE OF ORGANIC PHOSPHATES

[75] Inventor: Carey M. Merritt, Pulaski, N.Y.

[73] Assignee: Niagara Mohawk Power Corporation, Syracuse, N.Y.

[21] Appl. No.: 410,983

[22] Filed: Mar. 27, 1995

[51] Int. Cl.$^6$ .................... C02F 1/28; C02F 1/42
[52] U.S. Cl. .......... 210/669; 210/692; 210/799; 210/259; 210/265; 210/266; 210/683
[58] Field of Search .................. 210/669, 689, 210/690, 691, 692, 694, 266, 265, 259, 693, 799, 683, 751; 588/255; 558/211

[56] References Cited

U.S. PATENT DOCUMENTS

| | | | |
|---|---|---|---|
| 2,373,807 | 4/1945 | Beeg et al. | 260/461 |
| 3,394,812 | 7/1968 | Cohen et al. | 210/134 |
| 3,408,289 | 10/1968 | Gustafson | 210/669 |
| 3,420,773 | 1/1969 | Selmeczi | 210/683 |
| 3,520,806 | 7/1970 | Haigh | 210/692 |
| 3,531,463 | 9/1970 | Gustafson | 210/692 |
| 3,649,721 | 3/1972 | Burrous et al. | 260/990 |
| 3,708,508 | 1/1973 | Schulz | 252/364 |
| 3,985,648 | 10/1976 | Casolo | 210/669 |
| 4,080,290 | 3/1978 | Kläntschi et al. | 210/683 |
| 4,096,209 | 6/1978 | Randell | 558/211 |
| 4,182,676 | 1/1980 | Casolo | 210/669 |
| 4,302,335 | 11/1981 | Habermas | 210/669 |
| 4,341,636 | 7/1982 | Harder et al. | 210/669 |
| 4,374,028 | 2/1983 | Medina | 210/669 |
| 4,627,921 | 12/1986 | Meyers et al. | 210/669 |
| 4,793,947 | 12/1988 | Izumida et al. | 210/683 |
| 4,874,485 | 10/1989 | Steele | 976/DIG. 380 |

*Primary Examiner*—Cynthia L. Nessler
*Attorney, Agent, or Firm*—Lalos & Keegan

[57] ABSTRACT

Process and apparatus for separating aryl phosphates and esters and hydrolysates thereof from water in an aqueous mixture thereof. A superposed layer of the mixture is decanted from a lower layer of the phosphates, esters and hydrolysates. The superposed layer is filtered with a filter having a pore size of between 1 micron and 25 microns to remove globules and solid particles. The effluent is then subjected to demineralization with an anion exchange resin to remove most of the hydrolysates. Thereafter a sorber composed of an organic polymeric material such as polypropylene removes any remaining phosphates and esters down to less than 250 ppb.

30 Claims, No Drawings

WATER RETRIEVAL FROM AQUEOUS MIXTURE OF ORGANIC PHOSPHATES

BACKGROUND

The present invention relates to the processing of aqueous organic phosphate mixtures. More particularly the present invention relates to the processing of aqueous organic phosphate mixtures to concentrate the mixtures and remove water in a clean and reuseable state. More specifically the present invention relates to the recovery of water from an aqueous mixture of mixed triaryl phosphates such as, trixylenyl phosphate and triaryl phosphate esters used to operate various electrocontrols hydraulically. Such electrohydraulic control fluid it is often in the art referred to as "EHC" fluid.

The EHC fluid is an oily liquid that is denser than water and though only very slightly soluble sufficient amounts can dissolve in water to create a significant concentration increase in organic carbon. This increase in organic carbon while not a problem in some areas of use nevertheless is detrimental to reactive fuel in nuclear power plants. Therefore, any leakage of the EHC from the containing hydraulic conduits can cause difficulty should it pass into various floor drains that may be situated beneath the hydraulic conduits. The EHC then contaminates the waste water communicating with these drains requiring a very difficult and time consuming expensive cleanup effort.

In the past, the EHC that has leaked and contaminated the waste water has been collected and passed to specialized contractors for environmentally safe processing. But the volume of such an aqueous EHC mixture can be oftentimes in the many hundreds of gallons, and at a very substantial processing rate per gallon of the aqueous EHC mixture, it can be very expensive to process the EHC mixture for safe disposal.

Assuming, for instance, a possible leakage of EHC into waste water and the collection of the resulting aqueous EHC mixture in about 170, 55 gallon drums containing a mixture of about 250 gallons of EHC fluid and 9,000 gallons of water saturated with the EHC, it has been found that the cost associated with the disposal of these filled 170 drums is estimated to be several thousand dollars per drum paid to an outside contractor. It is obvious that the total cost of such treatment in the amount of a number of hundreds of thousands of dollars is an extremely expensive undertaking even for a large utility company. Other options are not available such as discharging the EHC and water mixture into a nearby lake or river because of the chemical nature of the EHC fluid.

It was theorized that if a concentration process were able initially to significantly concentrate the EHC fluid by the extraction of the waste water, and if this waste water was free of EHC, the water could be reused for commercial purposes or discharged into the environment, all at an acceptable cost. It was further believed that the total amount of treatable EHC extracted along with any residual waste water would be so significantly reduced in volume that the overall cost of environmentally processing the EHC attributable to the leakage would be within acceptable limits. However, all known methods for fluid separation were found lacking primarily because they lacked the capability of removing the EHC below 250 ppb in order to produce environmentally safe water.

It is therefore the principal object of the present invention to concentrate an aqueous mixture of EHC fluids by removing waste water substantially free of EHC. A further specific object of the present invention is the removal of waste water from an aqueous mixture of the trixylenyl phosphate and the triaryl phosphate esters.

A further and more specific object of the present invention is to use an apparatus and method of physical separation, mechanical filtration, demineralization and adsorption capable of producing a substantial volume reduction of an initial aqueous EHC mixture in the range of about at least 12:1.

A still further object of the present invention is to provide an apparatus and method for the reduction of EHC levels in water from saturation, i.e. around 10,000 ppb to less than 250 ppb.

SUMMARY OF THE INVENTION

An apparatus and process for removing water and separating aryl phosphate esters and hydrolysates thereof from an aqueous mixture thereof. In the aqueous mixture, a superposed layer of a mixture of the phosphate esters and hydrolysates and water is decanted from a lower layer that is primarily the phosphate esters. The mixture of phosphate esters and hydrolysates is filtered with the filter having a pore size between 1 micron to about 25 microns. The effluent from the filtering is demineralized with an anion exchange resin to remove the hydrolysates. Thereafter the effluent from the demineralization is passed to a sorber composed of an organic polymeric material that may be polyethylene, polypropylene, polybutylene, polyamide, polyethylene terephthalate or polyvinyl chloride or the like to remove any remaining EHC and hydrolysates and produce an effluent of substantially useful waste water.

DESCRIPTION OF THE PREFERRED EMBODIMENT

Leakage of EHC from the conduits that serve the valves and other operations in the nuclear power plant of an electric utility is to be expected on occasion in spite of the care and proper maintenance provided to minimize such leaks. The EHC contaminates the waste water in the drainage system into which the leaks would pass, and its potential effect upon water in the environment is significant. It is therefore important to consider and solve the substantial problem of separating the EHC from the waste water before disposal or processing. First, however the nature of EHC must be reviewed.

EHC is a fire resistant hydraulic fluid commercially sold under the trademark FYRQUEL by Akzol Chemicals Ltd. of Toronto, Ontario that is identified as a composition of mixed triaryl phosphate esters and trixylenyl phosphate esters. Each of these ingredients is in approximate equal parts and the remainder is triphenyl phosphate of approximately 7–10%. The triaryl phosphate esters include phenyl substituted and unsubstituted moieties. It is important to understand that the EHC is a commercially available fluid used for hydraulic operations and the invention does not depend upon the particular composition of the hydraulic fluid provided it is composed of the triaryl phosphate esters and the trixylenyl phosphate esters in addition to a triphenyl phosphate. This EHC hydraulic fluid meets the requirements of the federal OSHA hazard communications standard (29 CFR 1910.1200).

EHC has a very different chemical composition from fats, oils or greases that may have been mixed or become part of an aqueous mixture because it is essentially a phosphorous atom surrounded by aromatic ester moieties and a carbonyl group. It is very weakly ionic and is more dense than water so that it falls below a water layer unlike the fats, oils and greases that are typically lighter and less dense than water. When in contact with water the EHC hydrolyzes to produce a variety of hydrolysates. It is found that while EHC fluid is very weakly ionic in water, the hydrolyzed portions of the aromatic constituents turn into phenols and render those portions, so changed, more ionic.

Assuming an EHC fluid of the following composition

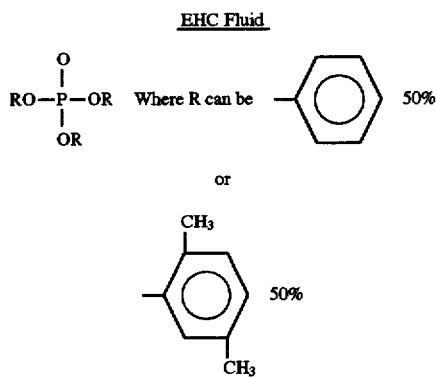

As shown in the general formula above, R can be phenyl or a methyl substituted phenyl such as the dimethyl phenyl and the R constituent can be mixed in any proportion of the constituents so that it produces a mixture of the aryl phosphate esters. There may be up to 6 different compounds in which all of the chemical species vary in water solubility, polarity, and ion exchangeability.

In contact with water, EHC hydrolyzes as shown in the following multistage production of the hydrolysates. In a first stage, only one of the ester moieties is hydrolyzed and a second stage two of the ester moieties are hydrolyzed and a third stage where all ester moieties are hydrolyzed, phosphoric acid is the final fully hydrolyzed hydrolysate.

perhaps about 0.4% of the total hydrolysates while in the third stage, where all of the ester moieties have been hydrolyzed to hydroxyl ions to produce phosphoric acid, this hydrolysate amounts to perhaps about 0.2% of all the hydrolysates.

With the unusual composition of the aqueous mixture of EHC and the hydrolysis products, it has been found that any of the conventional methods for separation of the EHC and their hydrolysates from water fails because the wide variety of composition components of such EHC aqueous mixture defies simple separation techniques.

After considerable effort and study it has been discovered that the separation of water from the EHC fluid requires a combination of specific separation techniques using specified apparatus and process steps in order to produce a clean separation wherein the aqueous mixture of EHC has been concentrated perhaps to about a 12:1 ratio and that the water being separated has an EHC concentration level down from the 10,000 ppb to less than a concentration of 250 ppb. These 4 steps and techniques are a) decantation, b) filtration, c) demineralization, and e) adsorption.

While each of these steps is simple, when standing alone they are ineffective. However in combination they produce an efficient and effective separation of usable or disposable waste water from the EHC fluid.

It also has been found that not only are these processes in combination important but the sequence and chronology of the steps are important to achieve the objects of the present invention. Without this discovered sequence, removal of EHC from the waste water down to the trace levels such as 250 ppb would not be possible.

It is known that various water treatment processes are conventionally used in a variety of other technology areas and include techniques such as filtration, ion exchange, distillation, precipitation and adsorption and the like. Often two or more of these technologies such as filtration and ion exchange for example are used to remove both suspended

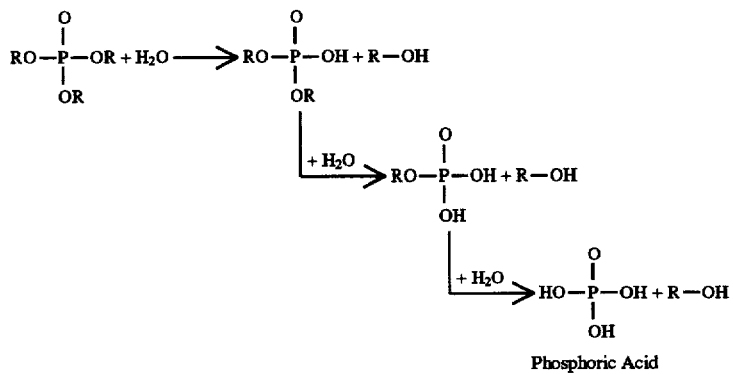

Phosphoric Acid

There are additional products of the hydrolysis of EHC and the more hydrated the phosphate molecule becomes the more water soluble and ion exchangeable the product becomes. Consequently it is perceived that the absorption coefficient for the hydrolysis product is inversely related to the level of hydration. Moreover, it has been calculated that the first stage of hydrolysis, where only a single ester moiety is hydrolyzed, constitutes the majority, perhaps up to 99% of the hydrolysis products, in addition to which phenols are also produced from the ester moiety. In the second stage where 2 ester moieties have been hydrolyzed to produce corresponding hydroxyl moieties, the hydrolysates total and dissolved solids from a fluid stream. In addition, it is known to use polymeric materials such as polypropylene to remove small amounts of oils, fats, greases, waxes, etc. from water. In such case the principle used is adsorption of the oil onto the polymer surface and is typically used for the removal of oils, fats or greases down to the parts per million range. However that residual concentration would not be adequate to meet the purposes and goals of the present invention wherein the EHC levels in the waste water at saturation are in the 10,000 ppb range but must be taken down to the much lower concentration of less than 250 ppb.

The term "EHC" may also include the hydrolysates produced by the hydrolysis of the EHC in water. As stated previously, EHC is more dense than water. Therefore, a dual layer of liquids results when EHC and water are mixed, in which EHC forms the lower layer. The superposed layer is primarily waste water and includes the dissolved EHC with the hydrolysates produced. This waste water still possesses too much of the EHC to be able to be used commercially for any purpose or to be discharged into the environment. The presence of at least 10,000 ppb of dissolved EHC including the hydrolysates would pose serious problems for the environment and cannot be simply discharged.

Accordingly, the first step in the process of the present invention is to separate the waste water layer from the bulk of the undissolved EHC layer. It has been found that decanting of the superposed layer is the simplest and easiest method of separation. The superposed layer of primarily water with the dissolved EHC and hydrolysates is decanted from a holding tank where the more dense EHC falls to the bottom and is removed by opening a petcock or the like in the bottom of the container while the superposed layer of water with dissolved EHC and hydrolysates is pumped out by any conventional pump such as an air driven pump or the like. It is possible that if the EHC and water were not placed in a container and permitted to rest to permit the settlement of the two layers to permit decantation of the superposed layer of water and dissolved EHC, it may be possible to omit the decantation step. However if the EHC and water are in a continuous state of motion so that the settlement does not occur between the EHC and water layer and the lower EHC layer, then decantation would not be effective as no physical separation between the layers would have occurred. In most instances it would be the best procedure to permit the separation to occur between the layers as previously stated so that decantation could be used to separate the EHC with hydrolysates and water from the lower EHC layer. Any visible separation into the two layers would otherwise be sufficient to meet the requirements of this invention. Alternatively, centrifuging would also separate the layers.

Assuming that the recommended settlement has occurred and that the decantation has drawn off the water with dissolved EHC and including the hydrolysis products, the next step to be utilized is a filtration step.

The decanted water and dissolved EHC with hydrolysates is preferably passed through a filter that may be in the conventional shape of a bag filter. This filter is designed to remove all suspended solids and suspended EHC globules. The suspended solids can be any of the solid impurities that may have been picked up by the EHC and waste water prior to the decantation. The globules of EHC are those large particles of EHC that are mutually attracting and are not dissolved in the water so that they produce large enough particles that can be mechanically filtered. The filter that meets these requirements has been found to have a pore size preferably in the range of 1 micron to 25 microns though preferably the pore size may be in the range of 5 microns to 10 microns.

The structure of the filter is preferably shaped similar to a bag so that the filtration occurs along the longitudinal axis of the bag and in a 360° direction. The shape of the filter is however not critical and a planar shaped filter or any other filter media that would be capable of performing the function of separating the water and dissolved EHC and hydrolysates from the EHC globules and solid impurities would be useful.

The bag may be composed of the preferable material polypropylene but any organic polymeric material such as would include polyethylene, polybutylene, the polyamids such as nylon and dacron such as polyethylene terephthalate and polyvinyl chloride would be suitable. It is also possible that the material could be composed of any suitable metal, wood, glass or ceramic material having the required pore size. The important factor to understand is that it is the pore size of between 1 micron and 25 microns that is the most important aspect of this filtration step and not the shape or composition of the filter.

The effluent from the filtration step, while having globules and solid particles removed still includes dissolved EHC and a variety of hydrolysates due to the hydrolysis of EHC in water. The effluent therefore would not be suitable for commercial purposes and could not be disposed of as environmentally safe. Accordingly it has been discovered that another step is required. It is important to note that the chronology of the process steps is critical because the products of hydrolysis must now be removed before the dissolved EHC is separated.

It has been discovered that this next important step in separation of hydrolysates from the water and dissolved EHC is a demineralization step. Demineralization may be carried out with any anionic exchange resin brought into contact with the effluent. The anionic exchange resin is not designed to remove any remaining EHC particles or unhydrolyzed EHC but rather is designed solely to collect those hydrolysis products of EHC particularly those with at least one or two hydroxyl moieties.

As has been stated above with regard to the hydrolysis, it occurs in stages. The first stage of the hydrolysis of EHC occurs when one of the aryl moieties of EHC is hydrolyzed to produce a hydroxyl ion and an aryl hydroxide such as phenol for instance. This stage of hydrolysis constitutes the greatest majority of the hydrolysis activity. The second stage occurs when two aryl moieties are transformed into hydroxyl ions with further aryl hydroxide molecules produced. The activity of this stage produces a much smaller percentage of the hydrolysates present, perhaps as low as less than 1% by weight. The third stage hydrolysis wherein the EHC is fully hydrolyzed, phosphoric acid is produced. At this final stage, all aryl moieties have reacted and produce hydroxyl ions to constitute an even lesser amount of the hydrolysates present, perhaps less than 0.5% of the hydrolysates present.

It has been found that the anion exchange is more effective when at least two hydroxyl ions on the hydrolyzed EHC molecule are present such as in the second and third stage. It is important to this invention to note that the anion exchange resin will essentially not adsorb any of the unhydrolyzed EHC. The predominant first stage hydrolysates is nevertheless also adsorbed. Demineralization is found to be so effective and efficient that as much as 90–95% by weight of all hydrolysates from each stage can be removed from the water. This total hydrolysate removal is made up of at least 90–100% by weight of the second and third stage hydrolysates that are adsorbed by the resin while perhaps only 80–90% of the first stage hydrolysates are removed. What remains after demineralization is essentially no second and third stage hydrolysates in the remaining waste water and a very small percentage of the first stage hydrolysate. But essentially all of the unhydrolyzed EHC still remains in the waste water effluent.

The anionic exchange resins that has been found to be particularly useful are the following: styrene based quaternary ammonium resins, acrylic based quaternary ammonium resins, styrene-divinylbenzene based amines, acrylic based amines, epoxy based amines, and phenolic based amines.

These and other resins that may be useful may be found in the "Sourcebook on Ion Exchange for Liquid Rad Waste Treatment", Electric Power Research Institute, EPRI TR-103326, Project 2414-06 Final Report, November 1993 prepared by Puricons, Inc., Malvern, Pa., pp. 2–12 through pp. 2–17. Of particular use has been found to be the trimethylamine quaternary structure often called the "standard Type I quaternary". Even more useful is the Type II quaternary where the functionality is derived from dimethylethanol amine.

The anionic exchange resin that forms a demineralizer may be placed in a conventional container for a demineralizer and provide for an inlet at the top of the demineralizer and after passage of the demineralized fluid through the demineralizer it also may exit at the top.

At this stage of the process the effluent from the demineralization contains unhydrolyzed EHC and any small amount of the first stage hydrolysate, i.e. EHC having two organic moieties remaining and only one hydroxyl ion. While the total amount of the unhydrolyzed EHC and the amount of the first stage hydrolysate is very small, it still is too great to permit the water to be used for any commercial purpose or to be released to the environment. Accordingly, the final step is important to remove the EHC and hydrolysates from the water and produce a residue of EHC and hydrolysates to less than 250 ppb.

To remove these small amounts of EHC and its hydrolysates and to produce a separation that will yield water that can be used commercially or discharged to the environment, it has been discovered that the last step is important so that EHC is removed down to the extremely low levels as stated. Removal of all but trace amounts of EHC has been accomplished previously by the filtration and ion exchange steps of this invention but these trace amounts are still too great and it is these trace amounts of EHC and hydrolysates that are to be removed by adsorption.

The adsorption is accomplished by use of an organic polymeric material that may or may not be in the shape of a bag as previously used. Again the shape is not critical. The organic polymeric material is preferably polypropylene but it also may be made of polyethylene, polybutylene, polyamide such as nylon, polyethylene terephthalate and polyvinyl chloride. While all these other organic polymeric materials may remove some of the EHC, the use of polypropylene is particularly and of significantly greater utility than any of the other organic polymeric materials. Only polypropylene when presented to the EHC containing effluent with a large surface area, as would be achieved with woven or matted polypropylene fibers can produce the ultimate separation. The form or shape of the sorber of the present invention while not important nevertheless it is desirable to present to the effluent as much surface area as possible so that more of the EHC and its hydrolysate may be adsorbed onto the surface of the sorber. Threads, fibers or other filaments meet the purposes of this invention but are not critical to successful adsorption. The diameter of the threads, fibers or filaments or the porosity of the sorber are also not critical. However there must be sufficient porosity to permit the passage of the water effluent while the EHC and its hydrolysate are adsorbed onto the surface of the sorber. After the adsorption the filter may be removed and the filter as well as the adsorbed EHC and hydrolysate may be burned while the effluent water is environmentally clean and commercially useable because it would have less than 250 ppb of EHC present.

As a specific embodiment of the present invention 170 55 gallon drums have been gathered containing EHC and water containing a mixture of approximately 250 gallons of EHC fluid and 9,000 gallons of water saturated with EHC. This aqueous mixture of EHC was permitted to settle and the EHC lower layer was removed and the upper layer of EHC and waste water with hydrolysates was removed and passed through a polypropylene filter having five micron pores so that all of the suspended solids and EHC globules were retained. The effluent was passed to a demineralizer having an ion exchange resin that was the dimethylethanol amine Type II quaternary where the amine functionality is shown as follows

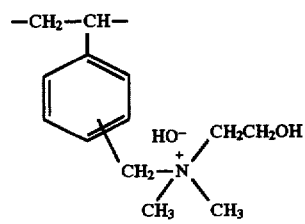

Thereafter the effluent from the demineralizer was passed through a polypropylene woven bag having 10–25 micron openings wherein the polypropylene surface area adsorbed remaining EHC and remaining hydrolysate to produce the water having less than 250 ppb of EHC or its hydrolysates.

In view of the foregoing it is believed that the objects of the present invention have been met and that the invention should be only limited in accordance with the following claims wherein

I claim:

1. The process of separating aryl phosphates and esters and hydrolysates thereof from water in an aqueous mixture thereof comprising, forming a superposed layer from said mixture of said phosphates, esters and hydrolysates, and water and a lower layer of primarily said esters and phosphates, removing said lower layer of said esters and phosphates to isolate said upper or superposed layer of said mixture, filtering said layer of said mixture with a filter having a pore size of between 1 micron to about 25 microns, subjecting the effluent from said filtering to demineralization with an anion exchange resin, thereafter subjecting the effluent from said demineralization to a sorber composed of organic polymeric material to produce an effluent consisting essentially of water substantially without said phosphates, esters or hydrolysates thereof.

2. The process of claim 1 including, removing solid particles and liquid globules of said phosphates and esters with said filtering.

3. The process of claim 1 including, removing hydrolysates of said phosphates and esters with said anion exchange resin.

4. The process of claim 3 including, said removing of hydrolysates with said anion exchange resin being the substantial majority of the hydrolysates present.

5. The process of claim 1 including, removing remaining amounts of said phosphates, esters and said hydrolysates by said sorption.

6. The process of claim 1 including, separating said lower and upper layers by decanting.

7. The process of claim 1 including, said filter for said filtering step having a pore size ranging from 5–10 microns.

8. The process of claim 1 including, said filter being composed of polypropylene.

9. The process of claim 1 including, said anion exchange resin being selected from the group consisting of styrene based quaternary ammonium resins, acrylic based quaternary ammonium resins, styrene-divinylbenzene based amines, acrylic based amines, epoxy based amines, and phenolic based amines.

10. The process of claim 1 including, removing at least 90% of the hydrolysates present in said mixture and substantially none of the phosphates or esters by means of said demineralization.

11. The process of claim 1 including, said organic polymeric material being selected from the group consisting of polyethylene, polypropylene, polybutylene, polyamide, polyethylene terephthalate and polyvinyl chloride.

12. The process of claim 1 including, said filter having a pore size of about 5 microns.

13. The process of claim 1 including, removing solid particles and liquid globules of said phosphates and esters with said filtering, removing hydrolysates of said phosphates and esters with said anion exchange resin, and removing remaining amounts of said phosphates and esters and said hydrolysates by said sorption.

14. The process of claim 1 including, separating said lower and upper layers by decanting, and said filter for said filtering step having a pore size ranging from 5 to 10 microns.

15. The process of claim 1 including, said filter being composed of polypropylene, and said anion exchange resin being selected from the group consisting of styrene based quaternary ammonium resins, acrylic based quaternary ammonium resin, styrene-divinylbenzene based amines, acrylic based amines, epoxy based amines, and phenolic based amines.

16. The process of claim 1 including, removing more than 90% of the hydrolysates and substantially none of the phosphates or esters by means of said demineralization, said organic polymeric material being selected from the group consisting of polyethylene, polypropylene, polybutylene, polyamide polyethylene terephthalate and polyvinyl chloride, and said filter having a pore size of about 5 microns.

17. The process of claim 1 including, removing solid particles and liquid globules of said phosphates and esters with said filtering, removing hydrolysates of said phosphates and esters with said anion exchange resin, removing remaining amounts of said phosphates and esters and said hydrolysates by said sorption, removing said lower layer by decanting, and said filter for said filtering step having a pore size ranging from 5 to 10 microns.

18. The process of claim 1 including, said filter being composed of polypropylene, said anion exchange resin being selected from the group consisting of styrene based quaternary ammonium resins, acrylic based quaternary ammonium resins, styrene-divinylbenzene based amines, acrylic based amines, epoxy based amines, and phenolic based amines, removing more than 90% of the hydrolysates and substantially none of the phosphates or esters by means of said demineralization, said organic polymeric material being selected from the group consisting of polyethylene, polypropylene, polybutylene, polyamide polyethylene terephthalate and polyvinyl chloride, and said filter having a pore size of about 5 microns.

19. The process of claim 1 including, removing solid particles and liquid globules of said phosphates and esters with said filtering, removing hydrolysates of said phosphates and esters with said anion exchange resin, said removing of hydrolysates with said anion exchange resin being the substantial majority of the hydrolysates present, removing remaining amounts of said phosphates and esters and said hydrolysates by said sorption, separating said lower and upper layers by decanting, said filter for said filtering step having a pore size ranging from 5 to 10 microns, said filter being composed of polypropylene, and said anion exchange resin being selected from the group consisting of styrene based quaternary ammonium resins, acrylic based quaternary ammonium resins, styrene-divinylbenzene based amines, acrylic based amines, epoxy based amines, and phenolic based amines.

20. The process of claim 1 including, removing solid particles and liquid globules of said phosphates and esters with said filtering, removing hydrolysates of said phosphates and esters with said anion exchange resin, said removing of hydrolysates with said anion exchange resin being the substantial majority of the hydrolysates present, removing remaining amounts of said phosphates and esters and said hydrolysates by said sorption, separating said lower and upper layers by decanting, said filter being composed of polypropylene, said anion exchange resin being selected from the group consisting of styrene based quaternary ammonium resins, acrylic based quaternary ammonium resins, styrene-divinylbenzene based amines, acrylic based amines, epoxy based amines, and phenolic based amines, removing more than 90% of the hydrolysates and substantially none of the phosphates or esters by means of said demineralizaton, said organic polymeric material being selected from the group consisting of polyethylene, polypropylene, polybutylene, polyamide polyethylene terephthalate and polyvinyl chloride, and said filter having a pore size of about 5 microns.

21. The process of removing water from an aqueous mixture of aryl phosphates and esters and hydrolysates thereof comprising, filtering said mixture with a filter having a pore size of between 1 micron to about 25 microns, demineralizing the effluent from said filtering with an anion exchange resin, sorbing remaining said phosphates and esters and hydrolysates from the effluent from said demineralizing with an organic polymeric material sorber, and collecting substantially clean water from said sorbing step.

22. The process of claim 21 including, said filter for said filtering step having a pore size ranging from 5 to 10 microns, and said filter being composed of polypropylene.

23. The process of claim 21 including, said filter for said filtering step having a pore size ranging from 5 to 10 microns, said filter being composed of polypropylene, removing more than 90% of the hydrolysates and substantially none of the phosphates or esters by means of said demineralization, and said organic polymeric material being selected from the group consisting of polyethylene, polypropylene, polybutylene, polyamide polyethylene terephthalate and polyvinyl chloride.

24. An apparatus for removing water from an aqueous mixture of aryl phosphates and esters and hydrolysates thereof comprising, in the following succession, decanting means to remove said aqueous mixture from any separate layer of said phosphates and esters and hydrolysates, filter means having a pore size of between about 1 micron to 25 microns for filtering said mixture, a demineralizer fluidly connected to said filter means to remove hydrolysates, from said mixture following said filtering, said demineralizer being an anion exchange resin, a sorber fluidly connected to said demineralizer, for receiving the effluent from said demineralizer, said sorber being an organic polymeric material for removing remaining amounts of said phosphates and esters and hydrolysates from said mixture to produce substantially clean water.

25. The apparatus of claim 24 including, said filter means for said filtering step having a pore size ranging from 5 to 10 microns.

26. The apparatus of claim 24 including, said filter means being composed of polypropylene.

27. The apparatus of claim 24 including, said anion exchange resin being selected from the group consisting of styrene based quaternary ammonium resins, acrylic based quaternary ammonium resins, styrene-divinylbenzene based amines, acrylic based amines, epoxy based amines, and phenolic based amines.

28. The apparatus of claim 24 including, said organic polymeric material being selected from the group consisting of polyethylene, polypropylene, polybutylene, polyamide polyethylene terephthalate and polyvinyl chloride.

29. The apparatus of claim 24 including, said filter means for said filtering step having a pore size ranging from 5 to 10 microns, and said filter means being composed of polypropylene.

30. The apparatus of claim 24 including, said filter means for said filtering step having a pore size ranging from 5 to 10 microns, said filter means being composed of polypropylene, said anion exchange resin being selected from the group consisting of styrene based quaternary ammonium resins, acrylic based quaternary ammonium resins, styrene-divinylbenzene based amines, acrylic based amines, epoxy based amines, and phenolic based amines, and said organic polymeric material being selected from the group consisting of polyethylene, polypropylene, polybutylene, polyamide polyethylene terephthalate and polyvinyl chloride.

* * * * *